Figure 1:
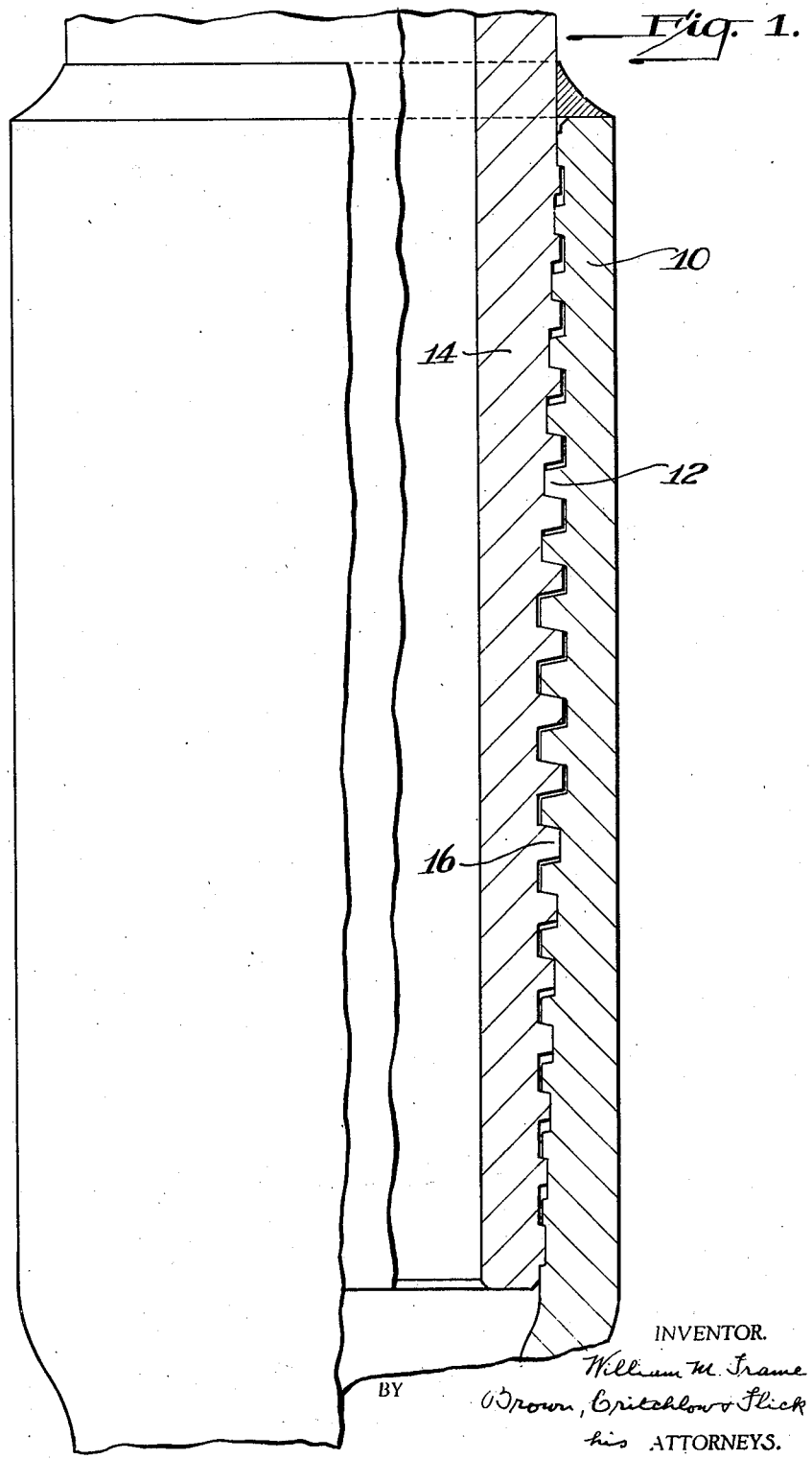

June 18, 1940.      W. M. FRAME      2,204,754
THREADED JOINT
Filed Dec. 29, 1938      2 Sheets-Sheet 1

INVENTOR.
William M. Frame
BY Brown, Critchlow & Flick
his ATTORNEYS.

Patented June 18, 1940

2,204,754

UNITED STATES PATENT OFFICE 2,204,754

THREADED JOINT

William M. Frame, Ben Avon, Pa., assignor to The National Supply Company, Pittsburgh, Pa., a corporation of Pennsylvania Application December 29, 1938, Serial No. 248,278

3 Claims. (Cl. 285—146)

This invention relates to threaded joints, and more particularly is concerned with threaded joints for oil well casing of a character adapted for use with a circumferentially extending sealing medium, such as a ring of welding metal.

In recent years a serious effort has been made to eliminate the usual threaded joint connecting oil well casing together end to end and to weld the casing lengths together. These efforts have met with some success in shallow wells, but welding casing down the hole has not been accepted by the trade for deep wells because of the danger of weld failure with the attending complications. A standard type of joint used in welding casing down the hole comprises a bell and spigot joint in which the bell is formed on the upper end of each casing length and the spigot is formed on the lower end. After stabbing the spigot end into the bell, an endless ring of welding metal is laid around the joint between the end of the bell and the adjacent portion of the spigot. It has been found in order to provide the necessary strength in axial pull and the requisite seal that two or three layers of welding material must be laid around the joint. Further, even the most skillful welder finds great difficulty in making the weld sufficiently free of strain so that the joint efficiency is high and the seal is perfect under the various conditions to which the joint is subjected.

In Howard G. Texter's copending application, Serial No. 247,756, filed December 27, 1938, now Patent No. 2,187,798, dated January 23, 1940, there is disclosed and claimed a combined welded and threaded joint and a method of making it which avoids and overcomes the foregoing and other difficulties of known practices. However, standard threaded joints for connecting oil well casing are not adapted for use with the Texter invention. First, standard threaded casing joints are relatively expensive and necessitate close production tolerances. Moreover, the standard American Petroleum Institute joint employs a V or Briggs thread so that when the joint is subjected to axial pull the sharply tapered flanks of the threads act in wedging relation on each other and cause radial expansion of the female joint member and radial contraction of the male joint member. This movement, together with attendant relative longitudinal movement tends to subject the welding metal to excessive stresses. Again, substantially all standard threads must be protected with guards during shipment or other handling and the A. P. I. joint is open to the additional objection of low joint efficiency. Furthermore, standard threaded casing joints usually must be made up with a lubricant which gasifies during a subsequent welding operation and blows through the weld seemingly in spite of every precaution that can be taken.

It is the general object of my invention to provide a threaded oil well casing joint particularly adapted to be used in conjunction with a circumferentially continuous seal of welding material or the like.

Other and more specific objects of my invention include the provision of a threaded joint for oil well casing or the like which has a relatively high efficiency (ultimate strength of joint divided by ultimate strength of member connected equals joint efficiency in per cent), can be shipped without protectors, can be made up with little or no lubricant, and which can be produced inexpensively by standard production equipment with broad working tolerances.

Another object of my invention includes the provision of a threaded joint for oil well casing or the like which can be cut on a relatively thin pipe end while maintaining a maximum of backing metal and which can be readily stabbed during the assembly of the joint.

Another object of my invention is to provide a threaded joint to be used in conjunction with a circumferential ring of sealing material and in which the threaded joint and not the seal acts to take up any bending stresses on the joint but without the necessary structure interfering with the rapidity and ease with which my joint can be assembled.

The foregoing and other objects of my invention are achieved by the provision of a threaded joint for oil well casing or the like in which complementary male and female joint members are provided with complementary threads having substantially flat crests and roots positioned parallel to the joint axis. The complementary threads are formed with substantially flat flanks having an included angle of between about zero degrees and about eighteen degrees and the roots of the female thread at the small or pipe end thereof are defined by tapers for somewhat less than half of the thread length and the roots so defined receive the crests of the male thread in bottoming relation. The roots on the large or pipe end of the male thread are defined by a taper for somewhat less than half of the thread length, and the roots so defined receive the crests of the female thread in bottoming relation. Preferably my improved joint includes complementary threads having crests of a constant width and roots of progressively greater width outwardly of the center of the thread so as to provide a clearance between the flanks of the threads which is progressively greater outwardly of the center of the thread.

Figure 2:
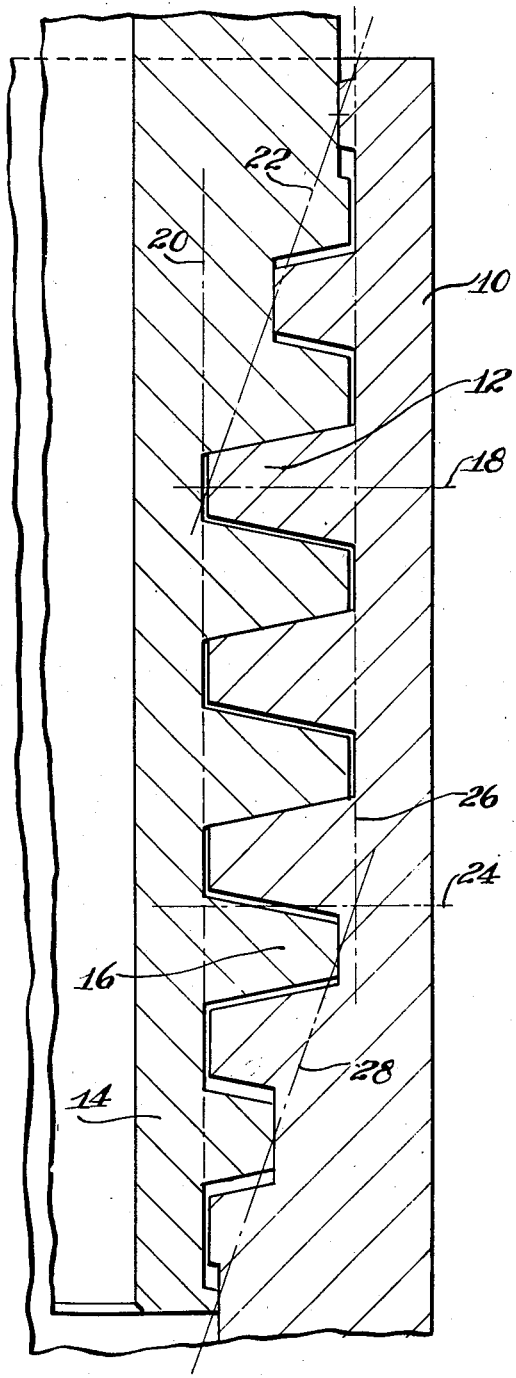
Figure 3:
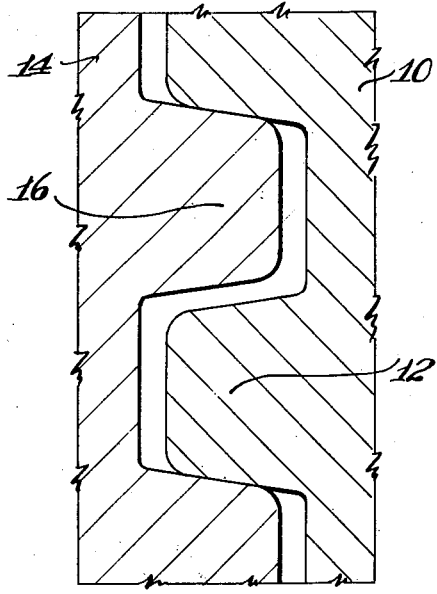

For a better understanding of my invention reference should be had to the accompanying drawings in which Fig. 1 is a side elevation partly in section of an improved joint incorporating the principles of my invention; Fig. 2 is a diagrammatic view of the thread illustrated in Fig. 1; and Fig. 3 is a cross sectional view on an enlarged scale of the thread form shown in Figs. 1 and 2.

While the improved threaded joint of my invention can be employed for threaded joints of various kinds, it is particularly adapted for use in connecting oil well casing together end to end with a subsequent welding operation, and accordingly has been so illustrated and will be so described.

The form and construction of my improved thread will best be understood from Fig. 2, in which the number of threads in a typical joint has been reduced and the height thereof increased to better indicate the construction. In this figure of the drawings, the numeral 10 indicates a female joint member which is provided with a continuous helical thread 12. Received within the female joint member 10 is a male joint member 14 which is formed with a continuous helical thread 16 which is complementary to the thread 12. The threads 12 and 16 are of a modified Acme type and include flat crests and roots which are parallel to the axis of the joint. The sides of flanks of the threads are substantially flat and are formed on an included angle of between approximately zero degrees and approximately eighteen degrees, and generally the included angle is about twelve degrees.

The roots of the thread 16 from the end of the male member to a radial plane 18, which is positioned somewhat more than half the length of the thread from the end of the male member, are defined by a cylindrical surface 20. From the plane 18 to the pipe or large end of the male joint member 14 the roots of the male thread 16 are defined by a truncated conical surface 22. The roots of the thread 12 of the female joint member 10 are defined from a radial plane 24, to the large or open end of the female member 10 by a cylindrical surface 26. The radial plane 24 is positioned somewhat more than half the length of the thread from the end of the female member. The roots of the thread 12 of the joint member 10 are defined by a truncated conical surface 28 from the radial plane 24 to the pipe or small end of the female joint member 10.

The crests of the thread 16 from the small end of the male joint member 14 to the radial plane 24 are likewise defined by the conical surface 28 so that they bottom in the roots of the complementary female member in this portion of the thread length. However, as shown in the drawings the crests of the opposed female thread from the radial plane 24 to the small or pipe end of the female joint member 10 do not bottom in the opposed complementary roots of the male member. In a similar, but reversed manner, the crests of the female thread 12 from the radial plane 18 to the open or large end of the female joint member 10 are defined by the truncated conical surface 22 so that these crests bottom in the opposed roots of the thread 16 on the male joint member 14. However, the crests of the thread 16 on the male member 14 do not bottom in the opposed roots of the female thread between the radial plane 18 and the large or open end of the female joint member 10. As shown in Fig. 2, none of the crests of the threads 12 and 16 bottom in the opposed roots of the threads between the radial planes 18 and 24.

While the exact number of threads per inch, the thread height and width and the tapers of the truncated conical surfaces 22 and 28 can be widely varied while maintaining many of the advantages of my invention, it will be understood that these various figures are largely dependent upon the particular use to which my improved threaded joint is to be put. By way of example, in an oil well casing joint formed directly on the ends of a seamless oil well casing having a five inch inside diameter, and a five and a half inch outside diameter, I employ five threads per inch, each approximately 1/10 of an inch in width and 75/1000 of an inch in height. The taper of the truncated conical surfaces 22 and 28 is between approximately 3/4 of an inch and approximately 1 3/4 of an inch per foot, and generally is at about 1 1/4 of an inch per foot.

An important feature of my improved threaded joint is that of forming all of the crests of the threads on both the male and female joint members of equal width, as shown in the drawings. When this is done the roots of the opposed complementary threads are formed of progressively increasing width outwardly of the planes 18 and 26. This not only facilitats the manufacture of the thread chasers used to cut the thread, but also results in gradually increased flank clearances outwardly of the radial planes 18 and 24 on the thread. This progressively greater flank clearance is clearly shown in Fig. 2 of the drawings, and I have found results in a more uniform loading of the threads when the joint is subjected to axial load. In other words, the threads at the center of the joint, for example, those between the radial planes 18 and 24, have their flank portions engaged first when the joint is subjected to axial load, and thereafter as the load is built up on the joint each of the flanks of the remaining threads comes into engagement upon the deformation of the threads of the joint which first engage so that all of the individual thread convolutions are loaded when the joint is subjected to relatively high axial tension. Without the progressively greater flank clearance outwardly of the center of the joint the center threads in the joint are not subjected to as great a load as the threads near the ends of the joint and thread failure or permanent deformation may result.

The threaded joint shown diagrammatically in Fig. 2 has been illustrated in the made-up position but with the weight of the male joint member 14 being downwardly against the female joint member 10. On the other hand, the threaded joint shown in Fig. 1 has been illustrated with the individual threads of the joint in the position that they take when the joint is subjected to an axially applied tensile load so that the flank clearances shown in Fig. 1 are with the various parts of the joint stretched to bring the flank surfaces into load-carrying engagement in quite a different relation than that shown in Fig. 2. However, it should be understood that the various flank clearances shown in both Figs. 1 and 2 are exaggerated to better illustrate the principle of my invention.

The female member 10 is shown in Fig. 1 as comprising a belled end formed integral with a length of conduit, such as a casing. However, it should be understood that the female member can be formed in any known manner as by upsetting, or it may take the form of a coupling sleeve or a female joint member cut directly on a length of pipe, although neither of the last two forms is preferable.

From the foregoing it will be evident that the objects of my invention have been achieved by the provision of an improved joint for oil well casing or the like and including complementary strong, rough threads which are relatively simple in construction but which provide a joint particularly adapted to resist relatively heavy axially applied tensile stresses. The improved joint of my invention is readily cut in large scale production quantities on a standard screw-cutting lathe to effect a satisfactory product with broad working tolerances. The joint does not have to be guarded by protectors during shipment and can be readily made up with little or no lubricant. The threads bottoming at both ends of the joint not only hold the parts aligned for welding but absorb any bending stresses on the joint in use. The clearance of the threads at the center of the joint allows the joint to be assembled and almost fully made up without the use of tongs. Furthermore, the sharply tapered runout of the threads insures easy stabbing and the cylindrical body of the thread provides a maximum of strength on relatively thin-walled pipes or the like.

It will be understood that my improved joint is particularly adapted to be used in conjunction with a ring of welded-on or other sealing material, all as particularly described and claimed in Howard G. Texter's said Patent No. 2,187,798, dated January 23, 1940. My improved thread is particularly strong in axial tension due to the progressive loading of the individual thread convolutions, all as described and claimed in my copending application Serial No. 247,782, filed December 27, 1938, now Patent No. 2,183,644, dated December 19, 1939.

While in accordance with the patent statutes I have specifically illustrated and described one embodiment of my invention, it should be understood that I am not to be limited thereto or thereby but that my invention is defined in the appended claims.

I claim:

1. A threaded joint for thin walled oil well casing and the like and comprising male and female joint members formed with complementary threads of a modified Acme type thereon, the roots of the female thread at the small or pipe end thereof being defined by a taper and receiving the crests of the male thread in bottoming relation, the roots on the large or pipe end of the male thread being defined by a taper and receiving the crests of the female thread in bottoming relation, said bottoming extending inwardly from each end for at least one-fifth but less than half of the total thread length so as to provide a rigid joint, and the intermediate thread crests and roots being defined by substantially cylindrical surfaces, none of said intermediate crests bottoming in opposed roots.

2. A threaded joint for thin walled oil well casing and the like and comprising male and female joint members formed with complementary threads of a modified Acme type thereon, the roots of the female thread at the small or pipe end thereof being defined by a taper for less than half of the thread length and receiving the crests of the male thread in bottoming relation, the roots on the large or pipe end of the male thread being defined by a taper for less than half of the thread length and receiving the crests of the female thread in bottoming relation, the crests of those portions of the threads having taper-defined roots being defined by cylinders, and the remaining thread crests and roots being defined by substantially cylindrical surfaces, none of said remaining crests bottoming in opposed roots.

3. A threaded joint for thin walled oil well casing and the like and comprising male and female joint members formed with complementary threads of a modified Acme type thereon, the roots of the female thread at the small or pipe end thereof being defined by a taper for less than half of the thread length and receiving the crests of the male thread in bottoming relation, the roots on the large or pipe end of the male thread being defined by a taper for less than half of the thread length and receiving the crests of the female thread in bottoming relation, and the intermediate thread crests and roots being defined by substantially cylindrical surfaces, none of said intermediate crests bottoming in opposed roots, said thread convolutions defined in part by the tapers having progressively greater flank clearances outwardly to the ends of the threads.

WILLIAM M. FRAME.